(12) United States Patent
Green et al.

(10) Patent No.: US 7,100,162 B2
(45) Date of Patent: Aug. 29, 2006

(54) SYSTEM AND METHOD FOR PROCESS MANAGEMENT

(75) Inventors: Brett Green, Meridian, ID (US); Curtis Reese, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 772 days.

(21) Appl. No.: 10/176,868

(22) Filed: Jun. 20, 2002

(65) Prior Publication Data

US 2003/0236811 A1    Dec. 25, 2003

(51) Int. Cl.
*G06F 9/46* (2006.01)
*G06F 15/00* (2006.01)

(52) U.S. Cl. ............. 718/102; 719/318; 719/328; 358/1.1; 358/1.15

(58) Field of Classification Search ........ 718/100–108; 719/318, 328; 358/1.1, 1.15
See application file for complete search history.

(56) References Cited

U.S. PATENT DOCUMENTS

| | | | | |
|---|---|---|---|---|
| 6,098,090 A | * | 8/2000 | Burns | 718/107 |
| 6,552,813 B1 | * | 4/2003 | Yacoub | 358/1.1 |
| 6,823,511 B1 | * | 11/2004 | McKenney et al. | 718/102 |
| 2002/0089687 A1 | * | 7/2002 | Ferlitsch et al. | 358/1.15 |
| 2002/0133641 A1 | * | 9/2002 | Royer et al. | 709/329 |
| 2002/0165892 A1 | * | 11/2002 | Grumann et al. | 709/100 |
| 2002/0184288 A1 | * | 12/2002 | Vargas et al. | 709/100 |
| 2003/0061265 A1 | * | 3/2003 | Maso et al. | 709/105 |
| 2004/0194088 A1 | * | 9/2004 | Chen et al. | 718/100 |

* cited by examiner

*Primary Examiner*—Meng-Al T. An
*Assistant Examiner*—Jennifer N. To

(57) ABSTRACT

A process task management system is provided to be used within an operating system environment. The system comprises an executing processes module containing a list of processes currently executing in the operating system environment. A status attribute is included for each process in the list, which represents an execution state of the process and is viewable by a user. A process state checking module is configured to check the execution state of each process when the process is busy, and to set the status attribute for each process to inform the user whether the execution state of the process is busy and performing processing activity.

11 Claims, 3 Drawing Sheets

| | Applications | Processes | Performance | Networking | |
|---|---|---|---|---|---|

Tasks

| Process Name | User Name | CPU | Mem | Status |
|---|---|---|---|---|
| Winword.exe | Usr1 | 00 | 1208K | Running |
| Canvas12.exe | Usr2 | 01 | 502K | Not Responding[Busy] |
| mmtray.exe | Usr1 | 00 | 18K | Busy [Network Access] |
| Groupwise.exe | Usr1 | 00 | 210K | Busy [Disk Access] |

Services

| Process Name | User Name | CPU | Mem | Status |
|---|---|---|---|---|
| Dbservices.exe | Usr1 | 02 | 1576K | Running |
| Ncontainer.exe | Admin | 00 | 320K | Busy [Memory Access] |
| Ldanap.exe | Admin | 06 | 1222K | Running |

FIG. 2

SYSTEM AND METHOD FOR PROCESS MANAGEMENT

FIELD OF THE INVENTION

The present invention relates generally to managing processes within an operating system.

BACKGROUND

When a user runs an application or program on a computer, the user is actually requesting the operating system to load and run one or more processes associated with that application. For example, an application can have a primary process that is loaded initially and additional auxiliary processes which may be loaded as needed.

From the point that applications load, the user expects to be able to constantly and quickly interact with each application whenever they desire. This constant interaction is frequently possible when just a small amount of processing is performed between user events, such as a button click or a menu item request in the application. For example, a word processor performs most of its processing in small chunks and the user is able to access the user interface seemingly instantaneously.

Other applications may not be available to the user for a certain period after the user has requested a complex or time-consuming operation. The period may be a few seconds or sometimes longer. Some applications and processes are able to present the user with a screen that notifies a user of the status of their request. Unfortunately, many processes cannot provide this status. This is especially true where the process running on the user's side has requested information from a process running on a remote server or database. In these situations, the process will make its request and then appear to freeze as the request is performed remotely from the local machine.

Even when an application presents a screen to the user and tells the user that the application or process is busy performing operations, the user may not know whether the service request is being processed or whether the application has crashed. This is especially true for an application that is not able to present a user with a progress screen. The user interface in such a situation will appear to be frozen but the application will actually be performing normal processing behind the scenes. Either the user must be patient in this situation or the user can decide to try to terminate the application or process. To terminate an application's processes, the user opens the operating system's task manager and requests that the specific processes terminate immediately.

If the user decides to terminate a process, this can be a problem in many situations because the process is not allowed to terminate normally when a user shutdown is initiated. This means that the normal cleanup and shutdown functions cannot be activated. Of course, there are legitimate situations where processes should be shutdown. A process should be shutdown when it has crashed or there has been a process or system malfunction. In these cases, the process should be stopped and restarted.

If the process is still working, then the user generally does not want to shut down the process because at some point the process will complete the task that the user has requested. Shutting down a process prematurely can cause serious problems for the process or the entire system. Shutting down the process prematurely can cause corruption in the process itself and cause corruption to other processes or a service from which the original process has requested information. One situation where this might happen is a process that is requesting information from or trying to write to a database. If the process is writing the information to the database and then the process is prematurely terminated, the database may be corrupted and/or left in a partially completed state.

SUMMARY OF THE INVENTION

The invention provides a process task management system that is used within an operating system environment. The system comprises an executing processes module containing a list of processes executing in the operating system environment. A status attribute is included for each process in the list, which represents an execution state of the process and is viewable by a user. A process state checking module is configured to check the execution state of each process when the process is busy, and to set the status attribute for each process to inform the user whether the execution state of the process is busy and performing processing activity.

BRIEF DESCRIPTION OF THE DRAWINGS

FIG. 2 illustrates one possible embodiment of an interface for a process task manager that divides processes into groups and displays detailed process statuses.

DETAILED DESCRIPTION

Figure 1:
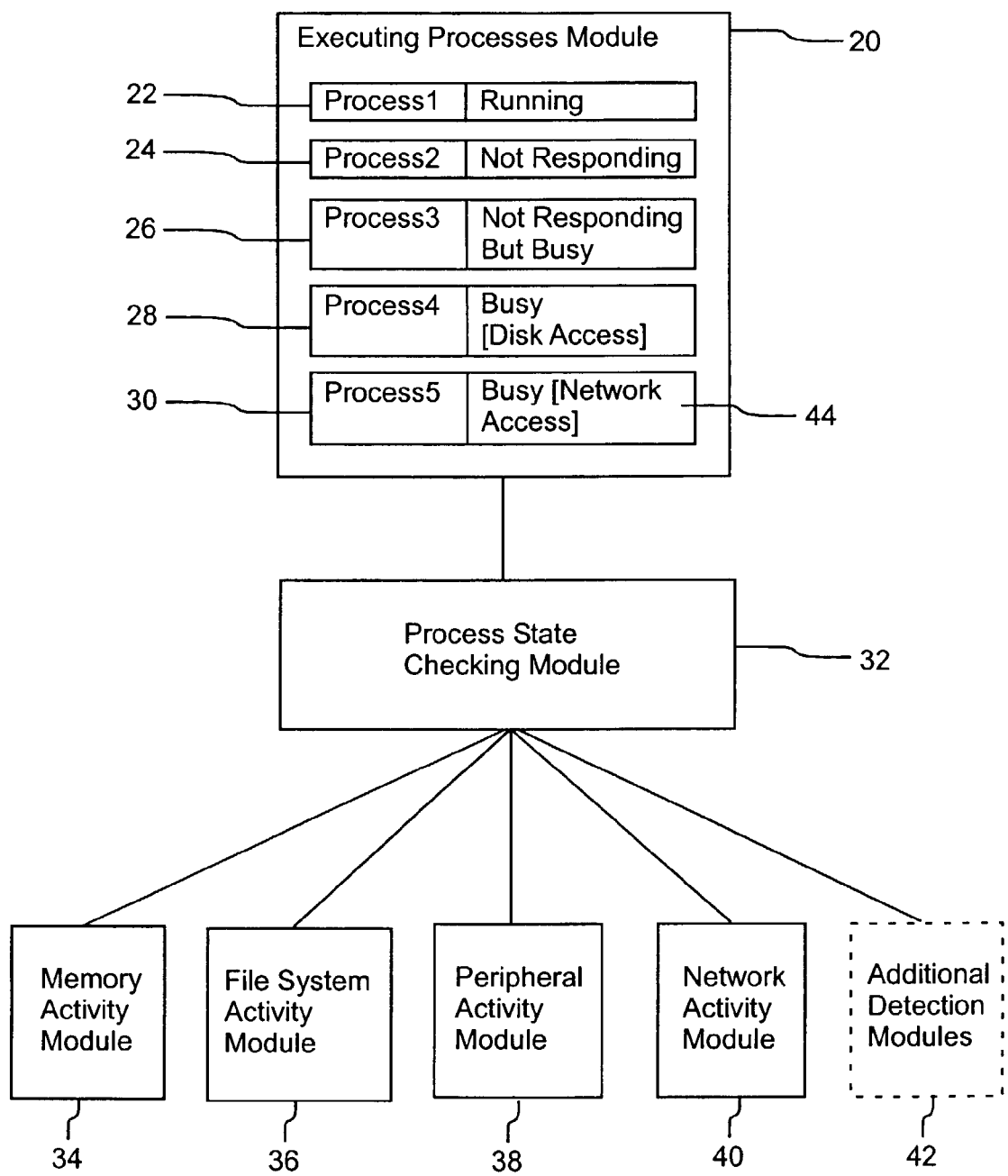
FIG. 1 is block diagram of a system for managing executable processes and process states in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

In current operating systems, the user can see some status indicators for processes as they are running in the operating system. Most operating systems can tell the user that a process is currently running according to normal process criteria. The operating system may also tell the user that the process is currently sleeping. In this situation, the operating system believes that the process is waiting for a requested function but the operating system does not know what that function is. In other situations, the operating system will state that the process is busy or not responding to the operating system.

In the situations described previously, it is difficult for a user to know whether they should terminate the process or wait. The process may appear to be busy to the operating system but the process may have actually crashed. If so, how much time should the user wait before the user determines that they should shutdown that process? In a similar manner, if the process is not responding, the user may suppose that the process will never respond or perhaps it will actually respond but it may not be for some time. In either of these cases, the process may be shutdown prematurely by the user causing memory corruption, database problems, or other bad system side effects.

In addition to the problems and side effects associated with a process being shutdown prematurely, the user must be careful which process types are terminated. Current operating systems list all of the runnable processes together in the same list and the user has access to shutdown any process without warning. A user may even accidentally shutdown a process by mistaking it for another process or another type of process. Most users have no idea whether they are shutting down an application process they have started or whether they are going to shutdown a service process that the operating system needs for multiple applications.

For example, if a user shuts down a word processing process they have started, this is unlikely to cause any initial problems. As a result of this shutdown, the process may have left behind several program parts or processes which are resident in memory that the user did not know were related to the terminated process. This creates memory fragmentation, corruption and other problems as discussed. A more severe case exists where the user shuts down a process for an operating system service (e.g., a communications service). This creates problems for all the processes that access that service. Because a user cannot immediately identify which type of processes they want to shutdown, the user runs the risk of shutting down processes and applications that could cause significant damage and/or memory corruption to the local system or even the entire network.

In order to deal with the problems discussed above, one embodiment of the present invention provides a process task management system that can be used within an operating system environment on a host computer. This process task management system allows a user to identify the detailed state of a process when it is busy or not responding. In addition, the present system and method allow a user to more easily differentiate between tasks and services in the operating system. Providing a detailed management system allows a user to make more informed choices when deciding whether to terminate a process from the task manager. This can help avoid the corruption of critical user data or system data that occurs when a process is abruptly halted while working in critical files.

FIG. 1 illustrates a process task management system for use with an operating system. The process task management system includes an executing processes module 20 that contains a list of processes 22, 24, 26, 28, 30 currently executing in the operating system environment. The term currently executing is generally defined here as processes that are runnable in the operating system or processes that are loaded in one of the operating systems' process queues. The list of executing processes can be acquired from the operating system kernel, through an application program interface (API), or another method that is defined by the operating system. Each process can run in its own environment and memory space with specified resources defined by the operating system. As the processes perform their processing, they access these defined resources and peripherals as the operating system allows them to have access. This access may be controlled by the operating system security.

Each process has a status attribute 44 that represents an execution state of the process. This status attribute is viewable by the operating system users through a graphical user interface (GUI). Frequently this interface is known as the task manager. A status helps users to identify the current process state and whether the process is continuing with normal processing. A normal processing state will often be a running state or an executing state.

Other states that can be defined by an operating system are the states of not responding or sleeping. In these process states, the operating system does not have any knowledge as to what the process is doing. The process may be awaiting further communication from peripherals, input and output systems, or the process may have abnormally terminated or crashed. If the process is operating abnormally or has crashed, then users want to terminate that process. Unfortunately, operating systems have not previously had the capability to provide any detailed information about whether a process has crashed or it is just performing other operations. This leaves it up to the user to wait an arbitrary length of time and then to finally terminate that process.

In order to overcome this uncertainty on the user's part, a process state-checking module 32 is provided to further clarify the state of an executing process. The process state-checking module checks the execution state of each process when it is busy. In the past, operating systems have informed the user that the process is "not responding" when it may just be busy performing other operations. Thus, the current invention determines generally what the process is doing during the time the process is busy. This activity information allows the process state-checking module to set the status attribute 44 for each busy process, and to inform the user that the process execution state is busy but the process is performing additional processing activity.

The process state-checking module 32 is in electronic communication with additional modules which are able to determine the type of processing activity that is taking place for the process being checked. An embodiment of the present invention also provides other detection modules that can be used are a memory activity module 34, file system activity module 36, peripheral activity module 38, network activity module 40 and additional detection modules 42. The detection modules are simply limited by the types of processing that the process state checking module can detect or interpret. Therefore, additional activity detection modules can include a terminal input module, pipe module, printer checking module, a remote database access module, a remote procedure call module, a writable optical media checking module, and other similar modules. The writable optical media checking module can check a rewritable CD, rewritable DVD or magneto-optical drive.

One way the activity modules can operate is to make requests of the operating system or service subsystems to find out if the operating system or subsystems are performing specific activities for processes. Alternatively, activity modules can be configured to receive events from memory subsystems, storage subsystem drivers, networking interfaces, etc., as these resources are accessed by processes. Activity modules can also use an API through which specific process activities can be queried. In this latter situation, the operating system can store the state of the process as it interacts with the APIs, and allow the activity module to query the state.

Tracking the process states as activities are in progress allows the executing processes module 20 to communicate a state for the process even when the process is busy. This reporting method conveys several additional process states to a user that have not been available before. The first of these is that the process is "not responding but busy" as illustrated by process 3 in FIG. 1. This is the simplest case where the process is not currently responding to the operating system kernel but it is known to be performing processing activity in some other part of the system. In some situations, the process state checking module 32 may not know where the process is performing activity but it will know that activity is taking place. The process state checking module will know that additional activity was requested by the process from the operating system and that activity is still taking place (e.g., memory accesses are still occurring). Similarly, the operating system may know that the process has requested a remote service. Then the operating system can periodically query the remote service to make sure that the remote service is actually performing processing for the process.

Another status that can be provided for processes is illustrated in FIG. 1 where process 4 provides a status of "busy and performing disk access" 28. Process 5 is represented as being "busy but performing network access" 30. In these two cases, the user knows the process is busy and the process is performing specific functions within the operating system, networked system, or computer subsystems. This helps the user because the user is less likely to terminate the process while it is performing functions that can be identified. For example, if the user knows network access is being performed, then they are more likely to wait until that procedure is completed. On the other hand, if the process is busy and memory is being accessed, then the user will realize that process is performing a large task in memory.

An advantage of the present system and method is the user can view a detailed status of a process and this aids in deciding whether to allow the specific task to run to completion. In the past, the users have had very little information about the status of a process. For example, prior art task management systems have informed the user that a task is running or not responding. As a result, users can prematurely terminate a process when it is not responding because the user believes the process is no longer performing any processing activity. In many situations, the process cannot reply to the task manager or the operating system but the process is still operating normally. Providing more detailed activity information as part of a process status reduces the chance a problem will be created by a user who abruptly terminates an application, while the process is still working (or performing some processing activity).

FIG. 2 illustrates a user interface for one embodiment of the system and method for process management within a task manager and operating system. In the past, users have been presented with a list of processes in the task manager. This list displays the service processes and task processes (or application processes) mixed together in the list along with any supporting processes or dynamic link libraries (DLLs) the process may use. Users who view this list generally have no idea what type of process they are viewing or considering shutting down.

Sometimes, the user will simply start selecting processes when there appears to be problems and shut them down regardless of whether the user knows what the process does. This is not such a serious problem if the process that is terminated is a crashed process. A problem is more likely to arise when a service process is terminated as it is performing a large task, such as a database query or network request. Critical files or database information may be corrupted when the process is terminated unexpectedly and the service may be used by multiple processes. Termination of the service process can then lead to a cascading failure of other applications or a loss of the ability to start applications that depend on that service. Other supporting processes or DLLs may also be left in memory to cause problems for other processes or to interfere with restarting the terminated program.

To avoid the problems described above, the task manager of the present system acquires the list of processes that are currently executing in the operating system environment. This list can be acquired by a request to the operating system kernel or through another interface to the process queue. Once a current process list has been obtained, the task manager identifies each process as either a service process or a task process. These processes are divided into two groups, a service process group and a task process group. Then each group is labeled and the task processes are grouped under a task label 50. The service processes are similarly grouped using a services label 52. The task label may also be designated as an application label or some similar description that denotes the process is not a service. This enables the process list 54 to spatially display the service process group and task process group as separate groups in the list. A separation of processes in the task manager allows a user to identify which type of process they are shutting down. This separation helps avoid the problems created by shutting down a service or the wrong type of process.

In the illustration of FIG. 2, the tasks are listed above the services. This is because a user is more likely to need to shutdown a task or application, as opposed to shutting down a service. It is desired that the user will first consider shutting down tasks and then consider the services. If it is clear a service has crashed or is having problems, then it can be terminated and the user will know they are shutting down a service. This is valuable because the services may in fact be used by many tasks or by other services. Of course, the services can be displayed above the tasks if desired.

Although the tasks and services are separated in FIG. 2, the tasks and services can also be listed together with a column that identifies whether the process is a service or a task. A user can then identify the services and tasks even though the processes may be mixed together in the list. The separation of tasks and services, as in FIG. 2, means the user is less likely to accidentally terminate a service. In an additional embodiment of the tasks and services labeling, the tasks and services may be arranged in other spatial orientations in a tab 54, such as displayed in panes that are side-by-side or in other configurations within the space shown.

Figure 3:
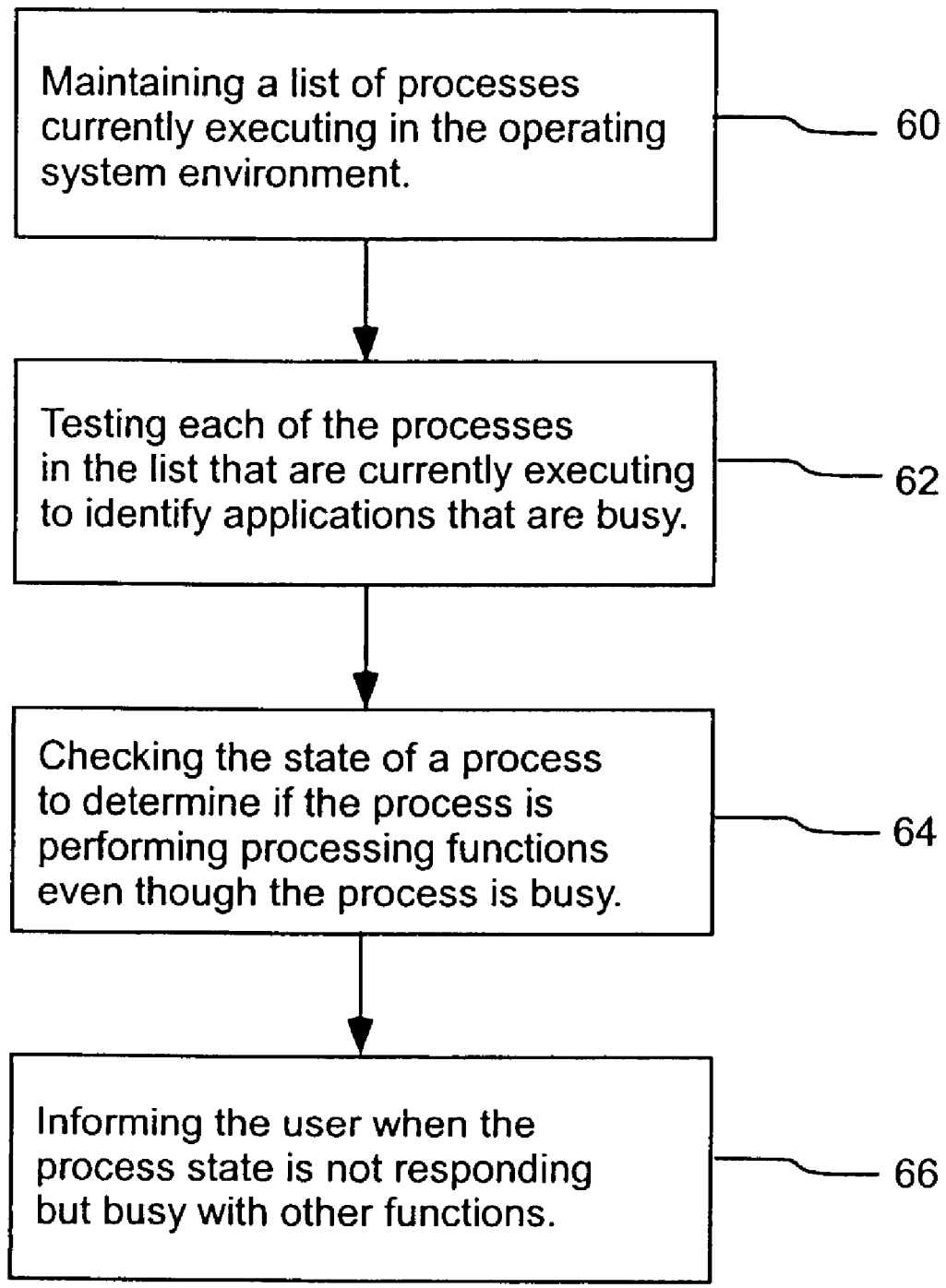
FIG. 3 is a flow chart depicting one embodiment of possible steps that can be used in checking process states and communicating process states to a user.

FIG. 3 is a flowchart illustrating an embodiment for process task management in an operating system. This embodiment can be implemented with the system structure of FIG. 1, by using an API, or as a system process that communicates with the operating system. The embodiment includes a first step of maintaining a list of processes that are currently executing in the operating system environment by block 60. One way to do this is by requesting a list of executing processes from the operating system and refreshing that list periodically. This process list along with each process' attributes will generally be viewable through a user interface or through what is known as the task manager in some operating systems. Another operation is testing each of the processes in the list to identify busy processes by block 62. Identification of the processes that are busy allows the system to perform further checking on those specific processes. If a process is running, then there is no reason to check to determine whether further activity is taking place because the process is known by the operating system to be in a running state or a ready state.

When the system has identified a busy process, then it performs the next step. Block 64 checks the state of the process to determine if the process is still performing processing activity even though the process is busy in block 64 or not responding. By checking the memory and file system resource usage for each busy process, the task manager can more accurately determine and report on the process' state. This way the task management system can inform the user when the process state is busy and performing processing activity or not responding in block 66 (as opposed to crashed). Additional processing activities can be checked to see if they are taking place, such as network access, input and output access, and similar operating system functions.

The system and method described above provides advantages as compared to prior art operating systems which generally report just two process states. For example, an operating system may display a running and not responding state for processes. In the past, a report of a not responding state for a process has not provided a way for a user to determine why the process is not responding. A not responding state does not indicate whether the process is busy performing other tasks and that is the reason why it cannot respond or whether the process has stopped performing all tasks. In other words, it is difficult for a user to determine when a process has actually crashed. This often causes the user to invoke the end task option when a process is busy performing other tasks. Since the present system and method allows the user to be better informed about a process' status, this reduces the number of instances when a user will abruptly terminate a process and cause corruption to critical data files or other problems. This invention helps manage the service processes, which are a specifically vulnerable class of processes.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention, it will be apparent to those of ordinary skill in the art that numerous modifications can be made without departing from the principles and concepts of the invention as set forth in the claims.

What is claimed is:

1. A process task management system that is used within an operating system environment, comprising:
    an executing processes module containing a list of processes executing in the operating system environment;
    a status attribute for each process in the list, which represents an execution state of the process and is viewable by a user;
    a process state checking module configured to check the execution state of each process when the process is busy, and to set the status attribute for each process to inform the user whether the execution state of the process is busy and performing processing activity; and
    a file system activity module, coupled to the process state checking module, configured to check if the process is accessing a file system when the process is busy and to allow the process state checking module to determine that the user should be notified the process is busy but accessing the file system, wherein
    the process state checking module is in communication with a peripheral activity module that checks to see if the process is printing to a printer peripheral in order to determine whether the user should be notified that the process is busy accessing the printer peripheral.

2. A system as in claim 1, further comprising a memory activity module, coupled to the process state checking module, configured to check if the process is accessing system memory when the process is busy and to allow the process state checking module to determine that the user should be notified the process is busy but accessing memory.

3. A system as in claim 1, further comprising a network activity module, coupled to the process state checking module, configured to check if the process is accessing a network when the process is busy and to allow the process state checking module to determine that the user should be notified that the process is busy but accessing the network.

4. A system as in claim 1, further comprising a writable optical drive module, coupled to the process state checking module, configured to check if the process is accessing a writable optical drive and is still running so the user is notified that the process is busy but accessing the writable optical drive.

5. A system as in claim 4, wherein the writable optical drive is selected from the group of rewritable optical drives consisting of a rewritable CD drive, rewritable DVD drive and a rewritable magneto-optical drive.

6. A system as in claim 1, further comprising a task category and a services category into which the list of processes is divided.

7. A method for process task management within an operating system environment, the method comprising the steps of:
    maintaining a list of processes that are executing in the operating system environment;
    testing each of the processes in the list that are executing to identify processes that are busy;
    checking the state of each busy process to determine if the process is still performing processing activity even though the process is busy; and
    notifying the user when the process state is busy and performing processing activity, wherein the step of checking the state of each busy process includes checking whether the process is accessing a printer when the process is busy and notifying the user that the process is busy and accessing the printer.

8. A method as in claim 7, wherein the step of notifying the user further comprises the step of notifying the user when the process state is busy but not responding.

9. A method as in claim 7, wherein the step of checking the state of each busy process further comprises the steps of:
    checking whether the process is accessing system memory when the process is busy; and
    notifying the user that the process is busy and accessing system memory.

10. A method as in claim 7, wherein the step of checking the state of each busy process further comprises the steps of:
    checking whether the process is accessing a file system when the process is busy; and
    notifying the user that the process is busy and accessing the file system.

11. A method as in claim 7, wherein the step of checking the state of each busy process further comprises the steps of:
    checking whether the process is accessing a network when the process is busy; and
    notifying the user that the process is busy and accessing the network.

* * * * *